A. J. KELLOGG.
COMPENSATING TRUCK FOR RAILWAY CARS.
APPLICATION FILED NOV. 25, 1910.
999,192.
Patented July 25, 1911.
3 SHEETS—SHEET 1.
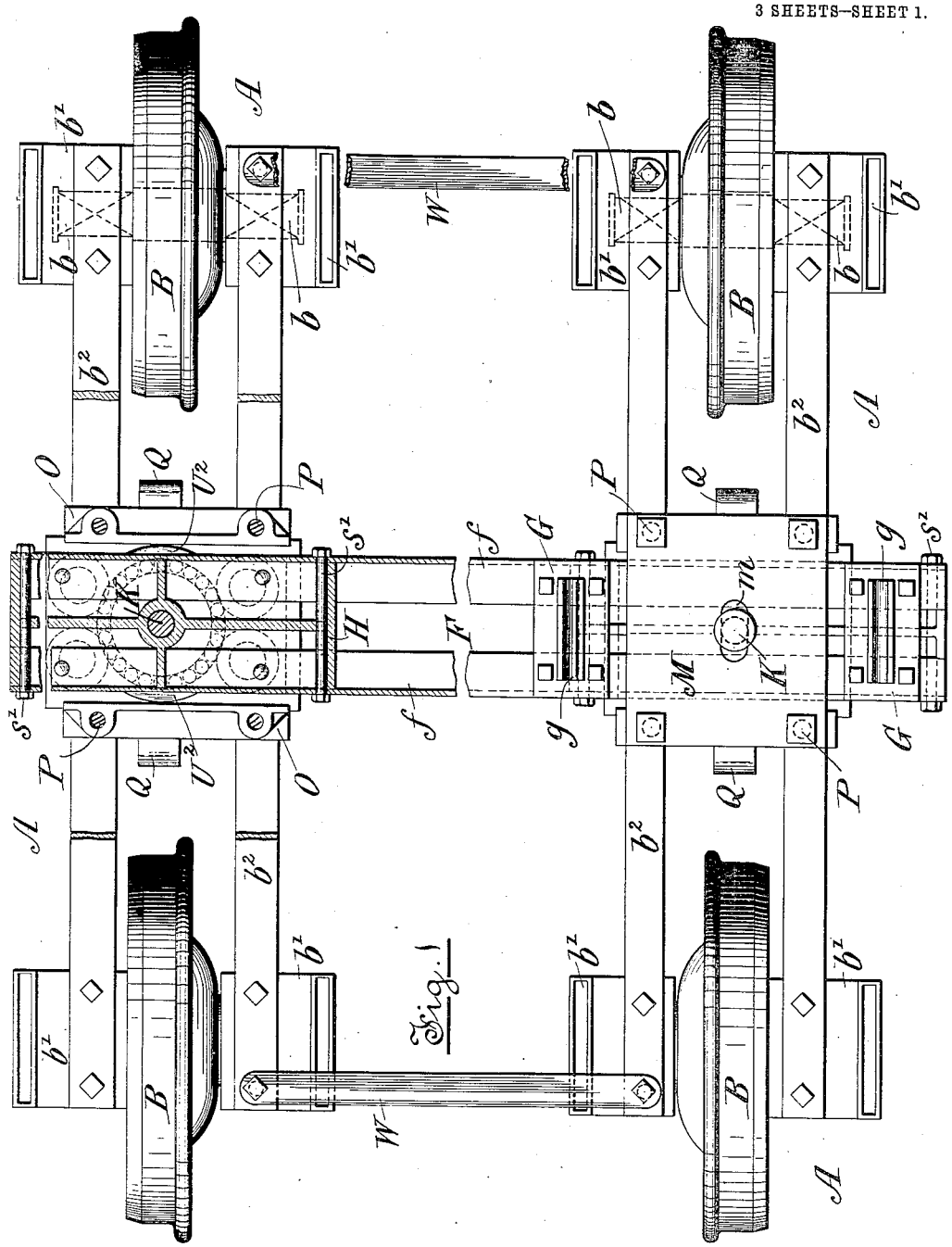

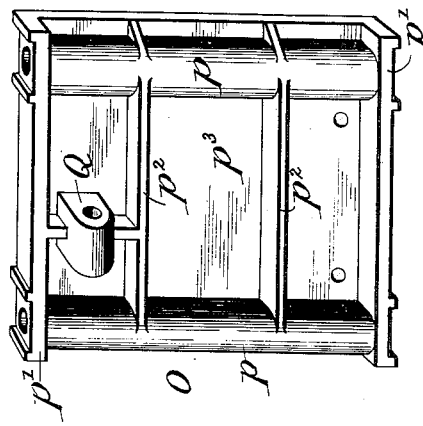
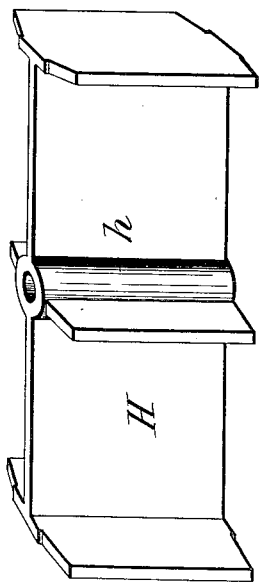
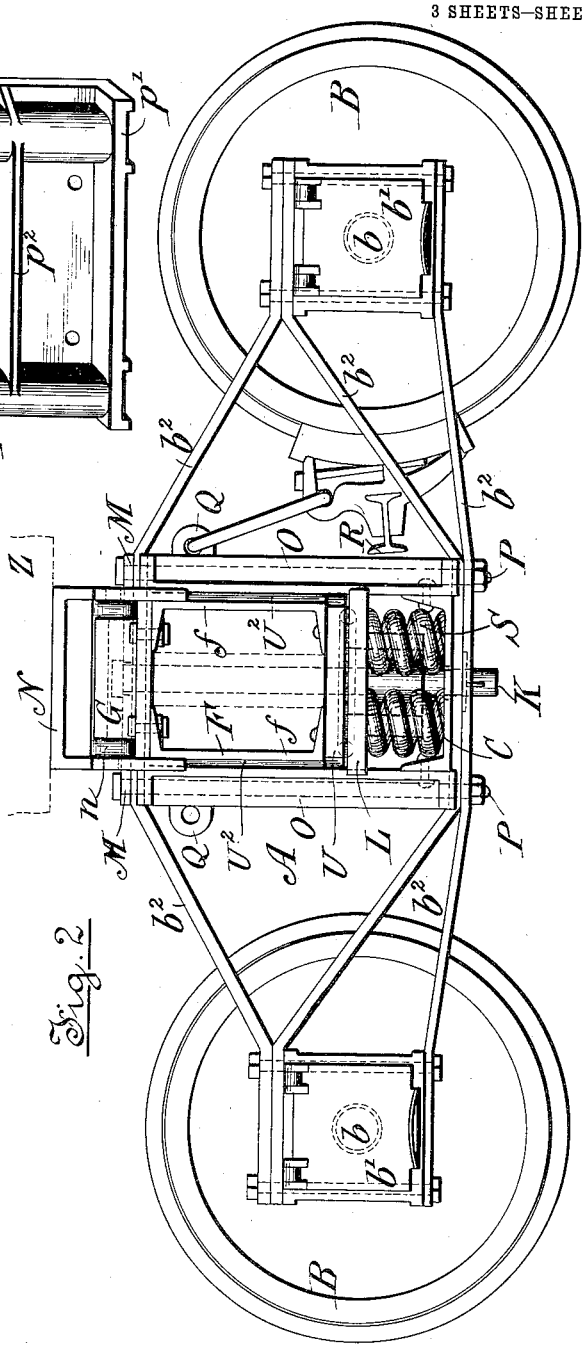

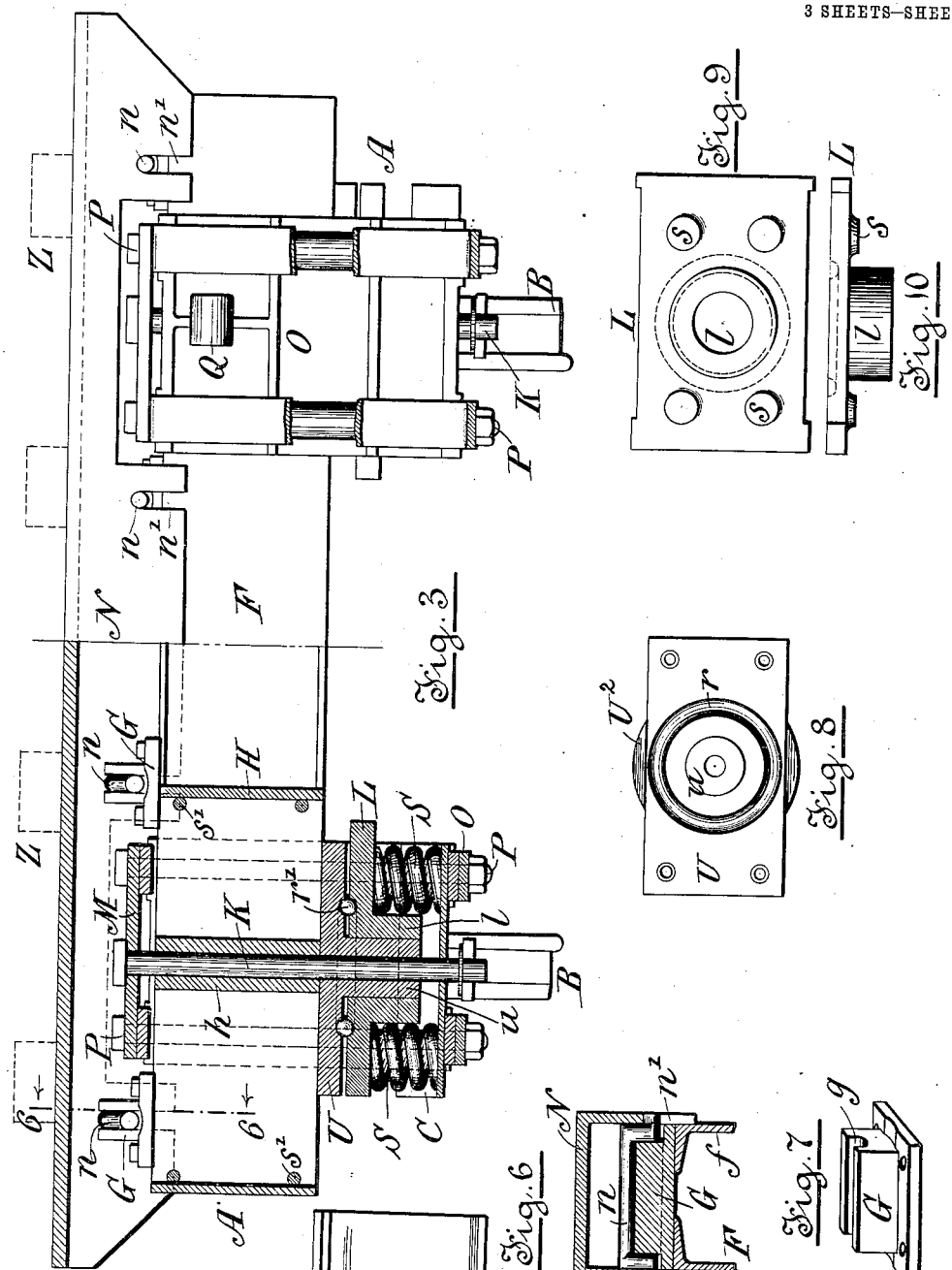

UNITED STATES PATENT OFFICE.

ALFRED J. KELLOGG, OF NEWBERG, OREGON, ASSIGNOR TO THE KELLOGG COMPENSATING CAR TRUCK COMPANY, OF NEWBERG, OREGON, A CORPORATION.

COMPENSATING TRUCK FOR RAILWAY-CARS.

999,192.   Specification of Letters Patent.   Patented July 25, 1911.

Application filed November 25, 1910. Serial No. 594,174.

*To all whom it may concern:*

Be it known that I, ALFRED J. KELLOGG, a citizen of the United States, residing at Newberg, in the county of Yamhill and State of Oregon, have invented certain new and useful Improvements in Compensating Trucks for Railway-Cars, of which the following is a specification.

This invention relates to trucks for railway cars,—and has for its object to compensate for, or reduce to a minimum, the torsional strain to which the axles and bearings are subject,—and to obviate the invariable frictional and shearing actions of wheels and their flanges upon the rails of curves in a line of railroad, which occur by reason of the conditions wherein the outer wheels of a truck have a circle of a larger arc to traverse than that of the wheels on the inner and consequently shorter circle, with the resultant slipping and grinding of the latter, and similar heavy friction and tendency to shear of the former.

Another advantage to be derived from the use of a truck constructed according to my invention, in place of one of the old style, is that when from mechanical conditions the wheels may vary in diameter, and the corresponding slipping results therefrom (which really amounts to a length commensurate with the difference in diameter of the wheels in any given and fixed structure of the class here contemplated) such objections are entirely obviated by the use of my improvement, since each truck section and its wheels are independent in their action.

To these and other useful ends, my improved construction does away with axles extending between, or rigidly connected with wheels arranged in pairs, one for each rail of the track—and also supersedes the ordinary truck swiveling centrally upon a king-bolt having vertical connection with the car floor or framing,—and the invention may be briefly described as consisting of three essential main features, viz: first: an individual truck-section for each rail of the track, such truck-section carrying a plurality of wheels, and a separate axle for each wheel, with independent journals and bearings therefor,—second: a separate king-bolt whereby the truck-section riding upon one rail may swivel independently of that riding upon the other rail,—and third: means whereby those parts of the bodies of the truck-sections which carry the respective king-bolts are coupled together transversely, and the whole structure so brought into operative relation with the car as to allow independent action under every condition to the wheels of each truck-section in their tread and travel upon the outer and inner rails of a curve, respectively, and at the same time, when used upon straight tracks, insuring equal if not superior efficiency to that of the rigidly-coupled styles of wheels and axles and centrally-swiveling trucks now in use.

For full comprehension of my invention, and of a preferred construction whereby the same may be effectually and economically carried into practice, reference must be had to the following detailed description and to the accompanying drawings forming part of this specification, wherein similar letters of reference indicate like parts.

In said drawings:—Figure 1 is a sectional plan of a compensating truck embodying my invention. Fig. 2 is a side elevation. Fig. 3 is a transverse sectional elevation of my truck, and also especially illustrating the means I prefer to employ for its connection with a car-body. Fig. 4 is a perspective detail of one of the side pedestals of the central body of each truck-section to which the braces and brake-beams are also attached. Fig. 5 is a perspective detail of the separator employed in the central body of each truck-section, receiving the king-bolt in each case, and supporting the transverse beam extending between the truck-sections. Fig. 6 is a detail cross-section on line 6, 6, Fig. 3, illustrating one of the chairs and its connections. Fig. 7 is a perspective detail of the chair proper. Fig. 8 is a detail bottom plan of the upper center wearing-plate. Fig. 9 is a similar bottom view of the lower center or wearing-plate, and Fig. 10, a side elevation of the latter. Fig. 11 is a plan of the channel iron forming the suspension bar.

Premising that the ordinary braces, axle boxes, and general arrangement of each truck-section in its connection with wheels, axles, and brake-shoes, brake-beams, and the like, are of the same general class as used in the ordinary styles of trucks, and that the journals and axle boxes may be of the same general character as those usually employed, it is only necessary to reiterate the statement made herein above, that each pair of wheels B, B, may be considered as the plurality spoken of as existing in the respective truck-sections, A, A, and that $b$, $b$, are the separate axles for each wheel, finding journals in suitably arranged boxes $b^1$, $b^1$, supported in any suitable manner by braces, $b^2$, $b^2$, connected with the central body of the truck-section, the arrangement of all of these parts being immaterial to the carrying out of my invention in practice.

I will now describe the more particular features of the truck which I prefer to use in carrying out my invention, commencing with the central body of one truck-section. Here I employ a suspension bar C made from channel iron of suitable dimensions for supporting a plurality of springs S, there being four shown of the ordinary type, and the upper ends of these are held in place by bosses $s$ on the underside of a center plate L into the flanged and centrally-bored hub $l$ of which fits the hub $u$ of another center-plate U, these two center-plates U and L forming upper and lower wearing plates, male and female in character, with ball-races $r$, $r$, on their adjoining faces for the reception of anti-friction steel ball $r^1$. A king-bolt K passes centrally through these wearing plates, and also through a suitably bored hub $h$ of a winged casting which I term the separator H, and illustrate in detail in Fig. 5, and its general arrangement in the sectional part of Fig. 1. This king-bolt also passes through an elongated hole $c$ in the suspension bar C and also through a similarly-shaped aperture $m$ in a top-plate M, to allow of slight longitudinal movement of the truck section upon the king-bolt.

As shown particularly in Figs. 2, 3 and 4, I employ standards O, O, of peculiar form, one at each end of the central body of the truck-section, as a means of effectually binding its several rigid parts, together with the separator H, suspension bar S, auxiliaries, between the upper and lower braces $b^2$, $b^2$. Each of these standards O is formed with vertical tubular portions $p$, $p$, for the reception of bolts P, P, which extend also through the top-plate M and braces $b^2$, and are secured by proper heads and nuts as indicated clearly on Figs. 1, 2 and 3. Suitable top and bottom bars $p^1$, $p^1$, cross-webs $p^2$, $p^2$, and a back plate $p^3$ complete the main structure of the standard, but I also prefer to cast in one therewith at a suitable point, a boss Q from which the usual or any special brake beam R may be conveniently suspended.

Having thus described the essential features of the truck-sections A, A, which are exact duplicates of each other, I must now explain that they are firmly connected transversely by a beam F composed preferably of two parallel channel irons $f$, $f$, riveted upon the faces of the upper center-plates U, U, and having also the separators H, H, secured between them by bolts $s^1$, $s^1$, as shown clearly in Figs. 1 and 3. Transversely fixed upon this beam F, are a plurality of chairs G, G, (four being preferably employed—one close to each side of each truck-section) which chairs are provided with concave channels $g$, upon their upper faces, which loosely receive independently - constructed stirrups $n$, the trunnions of which project horizontally into vertical slots $n^1$ formed—to register therewith—in the sides of another and independent channeled beam N adapted to be permanently connected with the longitudinals of the car-body which are indicated by the dotted lines Z, Z, in Figs. 2 and 3. This construction effectually insures the easy and accurate riding of the car upon my compensating truck, and also permits of the necessary lateral motion, as will be readily perceived and understood by railroad mechanics.

The general operation of a truck such as I have described will also be apparent from the foregoing and from the drawings, but I may again call attention to the features therein affording the most adequate compensating movements viz:—first, the independent swiveling action of each truck-section upon its own king-bolt which takes place at the anti-fractional junction between the upper and lower centerplates; second, the provision for allowing all necessary longitudinal movement of the truck-sections (in the line of their travel upon the respective rails) through the medium of the elongated slots of the plates and braces through which the individual king-bolts pass; which also affords the important advantage that my truck is thus given the necessary flexibility of movement for re-adjusting the several wheels upon the track in case of derailment; and third, the loose stirrup and chair connections between the transverse truck-beams and the channeled beam extending across and fixed permanently to the sills of the car-body.

By reference to Figs. 1, 2 and 8, it will be seen that I form or affix upon the outer faces of the channel irons forming the transverse beam F, two cheek-pieces $U^2$ which always impact the inner walls of the end standards or pedestals O, O, while sufficient space is otherwise left between the outer sides of the beam F, and such standards to permit of all necessary swiveling movement without chance of the truck-section being carried materially out of its course in case of derailment.

W, W, represent cross-bars pivotally connected at their extremities to the upper faces of the oil or journal boxes $b^1$,—one bar at each end of the structure, so as to further connect the two truck-sections A, A, and hold them to gage in passing switch-points as well as to insure their same direction, and limit of movement whenever derailment may take place.

The advantages and novel principles being thus apparent, it must be understood that while I prefer to employ all of the essential features of construction herein described and illustrated, (having demonstrated their efficiency) I wish it to be understood that I do not limit myself to such details of construction or arrangement of parts, as the same may be varied and modified according to judgment and mechanical skill without departing from the principles or sacrificing the advantages of my invention.

What I claim and desire to secure by Letters Patent is as follows:

1. A compensating truck for railway cars comprising two truck-sections—one for each rail of the track—each having a plurality of wheels with a separate axle for each wheel,—a transversely-fixed connection between the bodies of the truck-sections,—a separate king-bolt upon which each truck-section may swivel independently, means whereby the wheels may adjust themselves in their tread upon their respective rails without relation to those riding upon the other rail,—and means whereby the individual truck-sections may be self-adjusting longitudinally upon their respective king-bolts.

2. A compensating truck for railway cars comprising two truck-sections—one for each rail of the track—each having a plurality of wheels with a separate axle for each wheel,—a transversely-fixed connection between the bodies of the truck-sections,—a separate king-bolt upon which each truck-section may swivel independently,—means whereby the wheels may adjust themselves in their tread upon their respective rails without relation to those riding upon the other rail,—means whereby the car body and the entire structure of the truck may have a limited lateral movement in relation to each other, and means whereby the individual truck-sections may be self-adjusting longitudinally upon their respective king-bolts.

3. A compensating truck for railway cars comprising two truck-sections—one for each rail of the track—each having a plurality of wheels with a separate axle for each wheel,—a transverse central connection between the bodies of the truck-sections whereby only a limited independent swiveling action is permitted between such truck-sections and the car body,—a separate king-bolt for each truck-section,—means whereby the car body and the entire structure of the truck may have a limited lateral movement in relation to each other, means whereby the individual truck-sections may be self-adjusting longitudinally upon their respective king-bolts,—and pivoted connections between the two truck-sections at their ends whereby the wheels thereof may always be held to gage while otherwise permitting independent action and self-adjustment in their relation to the respective rails.

In witness whereof, I have signed in presence of the two subscribing witnesses.

ALFRED J. KELLOGG.

Witnesses:
   E. V. LITTLEFIELD,
   MARY A. KELLOND.